Patented May 30, 1950

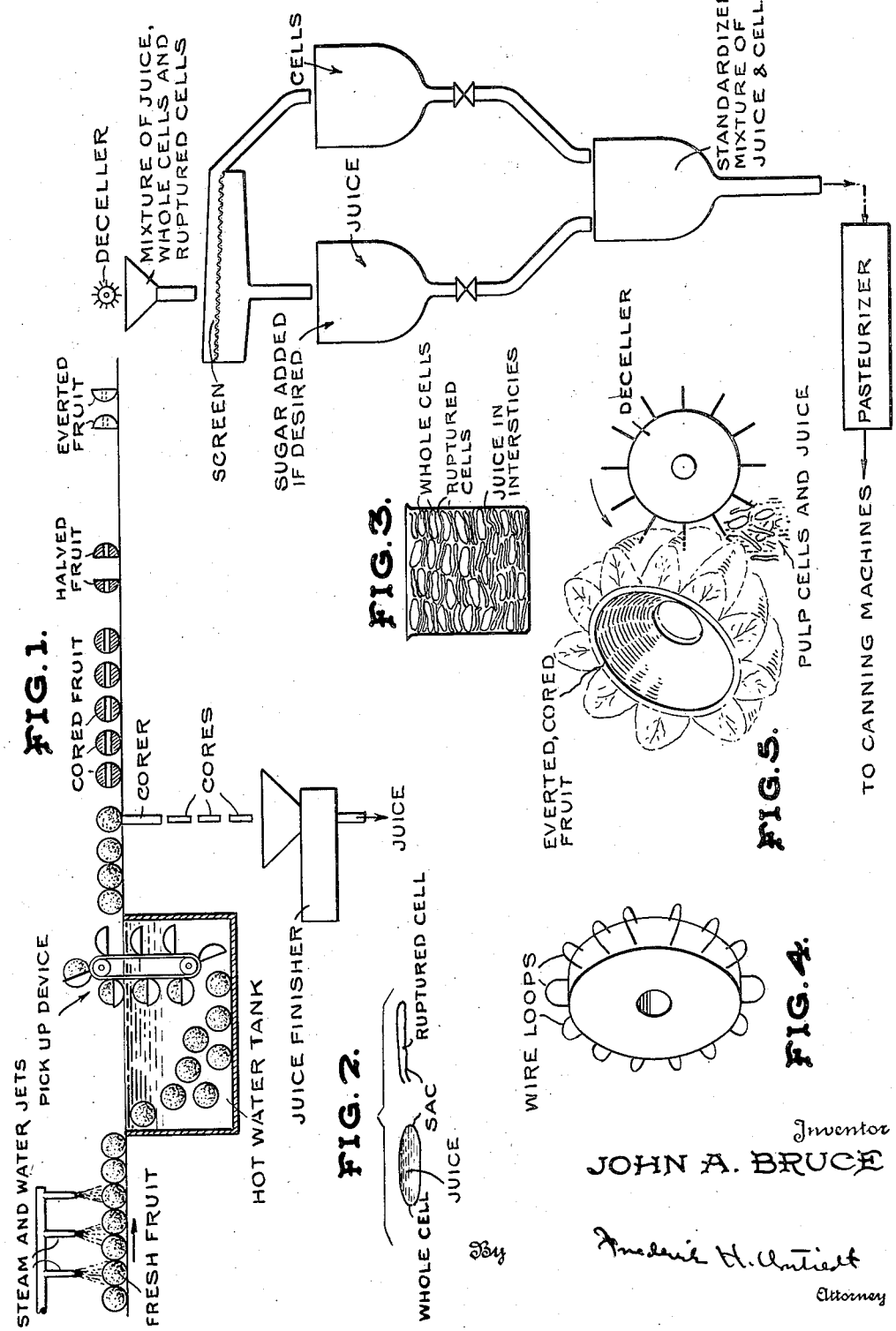

2,509,904

UNITED STATES PATENT OFFICE 2,509,904

CITRUS FRUIT PRODUCT

John A. Bruce, Tampa, Fla.

Application September 19, 1946, Serial No. 697,969

6 Claims. (Cl. 99—155)

This invention involves novel products from citrus fruits which are characteristically different from conventional citrus products such as canned citrus juices and citrus meat segments. The new products are adapted to a variety of uses for which conventional citrus products are not suitable.

Generally described, the products of the invention comprise disintegrated citrus meat. And mixed with such meat is a limited amount of citrus juice adapted to constitute therewith a relatively thick and substantially homogeneous mixture which might be described as a pulp or mush.

The disintegrated citrus meat comprises separated individual meat cells. Intact whole cells containing their juice are required to make the product acceptable both as to appearance and palatability as well as to render them stabile mixtures. However, ruptured individual whole cells can be and are included with the intact cells, and desirably so, since the juice extracted therefrom can be employed as the juice component (which may contain added sugar) of the mixture.

Further, while ruptured cells, because of their limpidity and tendency to stratify when in juice, will not provide acceptable products if employed exclusively, they can be included in greater proportion than the intact cells without detracting from the desired properties of the products.

The disintegrated citrus meat and juice mixture of the complete products may be further described by stating that when they are confined in a container substantially filled therewith the apparent volume of the mixture is occupied by the intact whole cells and ruptured whole cells with the juice filling interstices between the cells. The mixture will have little or no tendency to stratify into zones in which the juice appears as a layer relatively free of the cells despite the size of the cells. Such condition is attributable to the nature of the intact cells and the fact that the disintegration of the meat into cells avoids lumps.

Citrus fruit, such as oranges, grapefruit and lemons, is composed of an outer rind or peel and an inner pulp formed in wedge-shaped segments which are separated one from another by a fibrous layer or wall commonly referred to as "rag." The meat segments are substantially composed of citrus fruit "cells." These are elongated or oval-shaped sacs containing the citrus juice. In each segment of meat the cells are closely packed together to form a firm, self-supporting mass of fruit cells.

Large quantities of citrus fruits are processed for the preparation of products which may be sold in cans, as canned fruit juice or as canned "segments." A fairly substantial quantity of grapefruit is sold as canned grapefruit segments. In segmentizing grapefruit the rind is cut off by hand and the segments separated. Operatives then fill cans with these individual segments. This is an expensive operation, a premium must be paid for selected fruit, there is considerable industrial hazard attached to the process due to dermatitis, and because of the costs of making such canned products the segments must sell at a high premium which in turn lessens consumer demand.

When the fruit is to be processed for the preparation of a canned juice one customary procedure is to halve the fruit by means of a knife cutting the fruit transverse the core; then the halved fruit is subjected to the action of a rotating burr, or a squeezing device of some kind, which is designed to break down the fruit "meat" completely. This ruptures and defibrinates the individual fruit cells of the meat so that the juice therein can be liberated to the fullest possible extent. The mixture flowing from the burring or juice-extracting operation thus consists of a mixture of juice, rag, seeds, and a more or less small amount of broken-down cell-sacs, the remainder of the cell sacs adhering to, or remaining with the rind. These cell sacs can be defined as the sacs which originally contained the juice, "whole cells" being defined as the cell sac containing the juice.

The juice mixture must, of course, be screened to free it from insoluble solids. Consequently, it is filtered or otherwise clarified to remove the filterable constituents to yield a juice which, although cloudy, contains no settleable solids. The insoluble solids filtered out, which consist of a mixture of rag, seeds, disintegrated cell sacs and portions of the inner rind of the fruit, are usually dried to form what is known as a "meal" which is useful as a fertilizer, animal feed stock, and the like.

The resulting "clear" juice is then sweetened, if desired, pasteurized, and packed in cans. Within recent years much of this juice has been concentrated to yield concentrates which can be reconstituted with water. In other instances the juice has been dehydrated to the point where a solid product is obtained. See, for example, my U. S. Patent 2,366,591.

Thus, on the one hand, the bulk of citrus fruit processing has been directed to obtaining a juice suitable for canning or further processing, and on the other hand to the canning, on a markedly lower scale, of grapefruit segments. These are the two major products of citrus fruit processing.

Of late some attempt has been made to make citrus fruit products containing a portion of the disintegrated cell sacs, i. e. cell fragments. The cell sacs are nutritious and valuable food constituents. By the use of suitable screens the juice flowing from the burring operation mentioned above can be separated into a juice containing insoluble solids composed of the broken-down cell sacs, and a residue of solid material composed of seeds and rags. Because of the nature of the burring operation the whole cells are substantially disintegrated into fragments of small particle size; indeed this is the object of the operation, since what is desired is as much juice as possible.

Other workers in this art have recognized the values inherent in such broken-down cell sacs and, as stated, have attempted to prepare commercially satisfactory citrus juice products containing these insoluble solids. A review of the prior art reveals that others have added colloidal agents to such suspensions of juice and disintegrated cell sacs for the purpose of maintaining the cell sac fragments in suspension. This is accomplished by the addition of such substances as gelatin and pectins and these collodial agents act as suspension agents for holding the cell sac fragments in suspension. It is, of course, obvious that in order to accomplish the desired result the cell sacs must be broken down to fine particle size as much as possible since the finer the particle the more readily is it suspended in the continuous phase of fruit juice.

In effect then, this line of attack on the problem of preparing a citrus fruit product containing the desirable broken-down cell sacs has been directed toward the use of added materials of colloidal nature functioning as protective colloids to prevent settling of the insoluble solids.

It is, of course, obvious, that the addition of suspending agents, such as gelatin, or pectins, for the purpose of suspending finely divided solid is not too attractive commercially. Besides, the ultimate finished product does not have eye appeal for the consumer and it is in effect nothing more than a citrus juice containing finely divided insoluble solid material.

I have now set myself to the problem of preparing novel citrus fruit products containing the constituents of the segments, that is, a disintegrated meat citrus fruit product wherein the cells are whole instead of being fragmentized. I have had for an object of my researches a citrus fruit product having characteristics markedly different from those hitherto described in the prior art. What I have aimed for is a product which has consumer appeal, which contains all of the nutritious elements of the meat but is free of seeds and "rag," and which can be utilized in many different ways as a foodstuff.

Prior practice has been faced with a dilemma; either the juice has to be strained wholly free of cell residues or fragments, or the cell sacs must be so completely pulverized that they can be stabilized against separation by adding colloidal stabilizing agents. Accordingly, I have completely departed from any of these teachings of the prior art.

I have discovered that the meat segments disposed between the "rag" walls of the citrus fruit can be "de-celled" or disintegrated to yield a mixture of citrus juice, whole cells having unchanged physical form, and cells which have been ruptured, but only to the extent necessary to liberate the juice therein. This de-celling operation on the meat segments is thus markedly different from the drastic burring operation of the prior art. In making my products I do not extract all of the available juice because I want to isolate individual, intact whole cells still having their juice content, and individual ruptured cells (the cell sacs) in which the physical form thereof has been unchanged apart from the ruptures therein. Fragmentation of the cell sacs is, consequently, avoided. The result is a mixture of juice, whole cells and ruptured cells which on filtering yields a mixture of whole cells and ruptured cells and a filtrate composed of the citrus juice. I have further discovered that the mass of whole cells and ruptured cells can be recombined with the juice, which may first be sweetened, predetermined, suitable in volumetric proportions yielding a mixture in which the apparent volume, as for example, viewed through a glass container, is occupied by whole cells and ruptured cells with the juice filling the interstices between the insoluble cells.

Under these conditions the "suspension" of whole cells and ruptured cells in the continuous juice phase is, I have discovered, substantially stable. It is a kind of mush or pulp in which any tendency for the solid insoluble constituents to segregate is prevented by the physical characteristics of these whole cells and ruptured cells. They are unable to segregate because they mechanically impede one another. Many of them are in contact with adjacent cells. Although the mixture itself is readily flowable and pourable, nevertheless, because the whole cells and ruptured cells are large no segregation, such as to form a fluid layer substantially free of cells, will occur. This physical effect is due to cooperative relationship set up between the whole cells and the ruptured cells. There should be substantial amounts of whole cells present, advantageously from 20% to 50% of the cell mixture. These whole cells are bulky and full of juice. They constitute a kind of large size "aggregate" with which the limpid ruptured cells are mixed as a smaller aggregate.

This product is a new concept in citrus fruit processing. It is entirely opposed to prior practices which had for their very object the complete breakdown of the cell structure of the individual cells in the pulp or meat, and did not consider the recovery of the whole cells and ruptured cells as an essential function of the operation.

These cells, prior to the burring operation of the prior art, are of substantial size as anyone can see by visually inspecting a segment cut from a grapefruit. In my product these cells are maintained intact as individual cells. That is to say, each little cell has been separated from its neighbor and is "unitary." The average size of a grapefruit cell, either whole cell or ruptured cell in my product, is about ¼" to ½" in length. The whole cells may amount to about one-third of the volume of the mixture of whole cells and ruptured cells although this ratio is subject to wide variation without departing from my invention. Thus, as indicated above, the whole cells may constitute from 20% to 50% of the cell mass with a ratio of 1:4 to 1:1 to the ruptured cells. The ruptured cells, in contrast with the whole cells, are limpid and free of liquid other than that which may flow into the empty cells, and the cell wall is collapsed. However, the length of the ruptured cells is about the same as that of the whole cells for there has been no breakdown or mutilation of the physical structure of the whole cells other than that necessary for the liberation of the juice.

I deliberately maintain the normal, intact physical structure of the whole cells and the ruptured cells as much as I possibly can and this is substantially complete. I deliberately avoid any substantial breakdown of the ruptured cells so that they are torn in half or otherwise broken down to insoluble cells fragments of much smaller particle size than the original cells. It is by observing these requirements that the citrus fruit product of the present invention is made possible.

Since the product of the present invention is a mush-like mass in which the apparent volume, when confined in a container substantially filled with the mixture, is substantially occupied by ruptured cells and whole cells I can freeze the product to give a frozen mass which can be cut into sections of any desired shape and used for salads. Or, if desired, gelatin can be admixed with the product, as in making an ordinary gelatin dessert, and on gelling the product can be cut into segments much the shape of ordinary grapefruit segments and used as a foodstuff. Thus the product of the present invention is versatile and has many uses which cannot be supplied by ordinary fruit juices or ordinary canned citrus segments.

Some of the stability, that is the resistance to separation of solids from liquid, may be due to changes in the osmotic pressure factors functioning in the mixture of whole cells and fruit juice. I note this as a further explanation for the marked stability of my product without being bound by the theory presented.

When, for example, the mixture of whole cells and ruptured cells is combined with juice to which sugar has been added then osmotic pressure relationships will be set up between the outer phase of sweetened juice and the juice contained within the whole cells. Under these conditions water from within the whole cells would tend to flow through the cell membrane into the outer phase, which has the higher sugar content. Osmotic pressure would tend to equalize the sugar content of the liquid within the cell and the outer continuous phase of sweetened juice. This in turn would tend to make the specific gravity of the liquid within the cell the same as that in the continuous outer phase and thus cause the specific gravity of the whole cell to closely approximate that of the fluid within which it is suspended. Conversely, if a diluted juice were the continuous phase there would be a tendency for water to flow from the continuous phase into the whole cells so that the osmotic pressure of the fluid within the whole cell and the outer phase is equalized. Osmotic pressure relationships may thus have something to do with maintaining the physical characteristics of my product but I am inclined to believe that greater emphasis should be placed upon the actual physical structure of the insoluble material in the product since, as I have stated, by maintaining the whole cells intact and in substantial amounts, and by maintaining the ruptured cells substantially the same as they existed before rupturing, apart from the punctures therein, permitting the juices to be liberated, I am able to make a stable product which shows no tendency to segregate into layers.

With respect to the matter of stability, I would like to point out, however, that if the product of the present invention is diluted with water or juice to a marked extent, the diluted mixture will form two layers, one of which is substantially free of cells, and the other, or cell layer, is composed of the whole and ruptured cells with diluted juice filling the interstices between the cells. This cell layer, however, will have the approximate volume of the original starting material before dilution. In other words, if the clear fluid is withdrawn then the remaining cell mixture will have an apparent volume substantially the same as that prior to dilution. Likewise, if the mixture of the present invention is unconfined there will be a tendency for a portion of the continuous phase of fruit juice to run off from the cells, but this is nothing more than a kind of filtering action due entirely to gravity.

In order that my invention may be more fully understood, I have illustrated on the appended sheet of drawings a flow sheet of one suitable process by which the present product can be prepared. I have also illustrated the appearance of my product when confined in a container substantially filled with the mixture.

Figure 1 is a flow sheet in substantially diagrammatic form of the process, Figure 2 indicates the approximate shape of the whole cells and limpid ruptured cells, Figure 3 illustrates a container in which the apparent volume thereof is occupied by the mixture of whole cells and ruptured cells, with the juice filling the interstices between the whole cells and ruptured cells. Figure 4 shows a suitable "de-celling wheel" which is rotated against the fruit segments as I shall more fully describe, and Figure 5 shows this wheel in action against an "everted" cored grapefruit half.

Referring to Figure 1 the fresh citrus fruit, such as grape fruit, oranges, lemons, or limes is first subjected to a preliminary washing and peel-softening treatment by spraying the fruit with steam and water jets. The primary function of this is to clean the fruit, and secondarily, to soften the peel somewhat. Then the fruit is conveyed to a hot water tank maintained at about 180° F. The fruit passes through this hot water tank either on a conveyor or by gravity flow to the other end thereof where it is picked up and conveyed to a coring device. The time of immersion in the hot water tank is advantageously about 5 minutes but this can vary in accordance with the fruit treated, the characteristics of the peel, etc. If the peel is especially hard a longer treatment in the hot water tank may be indicated. In the hot water tank the peel is softened. This makes it possible for a halved fruit to be "everted" as I shall presently describe, without cracking the peel. The hot water treatment may also advantageously affect the meat to enable it to be de-celled more readily.

After immersion in the hot water tank the fruit is conveyed to a coring device which I have schematically indicated. This coring device is simply a rotating tube about one inch or so in diameter and the fruit is pushed down over the tube and the core cut out. Most of the seeds come away with the core. The cores contain a small quantity of juice which is worth recovering and these cores can be passed through a juice finisher or extractor which crushes the core and separates the juice from the insoluble core fragments.

The cored fruit then passes along to where it is cut in half in a direction transverse the core and then these halved portions are "everted" or turned inside-out. Since the fruit peel or rind has been softened it is possible to turn the half inside-out thus breaking away much of the meat from the rag separating the segments of the fruit. Any seeds remaining in the fruit at this stage can be shaken out.

These everted halves are then subjected to a de-celling operation. One suitable device for this purpose consists of a rotating wheel which I have illustrated in Figure 4. This wheel is a few inches in diameter (about 7 inches) and has radially-spaced, U-shaped elements made of piano wire which is somewhat flexible. The everted halved fruit is held against this rotating de-celling element in such a manner that the meat is scraped away from the rind. A rotational speed of about 100 R. P. M. is satisfactory. Figure 5 shows an everted grapefruit held against the wire members of the rotating de-celling device, the meat being scraped out from the rind in a direction perpendicular to the edge of the fruit collars and parallel to the partition walls of the segments.

During the de-celling operation about two-thirds of the whole cells are ruptured and about one-third of the whole cells are removed intact under average conditions, but such ratio will vary with different operators and with variations in the fruit. Since, because of the rupturing of the whole cells, the juice content therein is liberated, the mixture flowing from the de-celling operation consists of a mass of juice, intact individual whole cells and individual ruptured cells. This mass flows on to a shaking screen having openings sufficient to permit the juice to pass through but to retain the mixture of whole cells and ruptured cells. A stainless steel screen with ⅛" openings is satisfactory for this purpose.

As the mass flows over the screen operatives pick out whatever seeds and pieces of rag have come through the de-celling operation. After the screening operation the juice is collected in a suitable container, as shown, beneath the screen and the mixture of whole cells and ruptured cells is collected in another container. Due to the shaking action and gravity feed over the screen this mixture of cells is caused to flow from the screen into the container.

I now have citrus fruit juice, such as grapefruit juice, and a mixture of grapefruit whole cells and ruptured cells having the physical characteristics I have elaborated on above. From this point on much variation can take place. In the simplest form of my invention I simply recombine juice and cell mixture in the proportions I desire. These proportions will be such that the apparent volume of the mixture in a container confining it is substantially occupied by whole cells and ruptured cells with the juice filling the interstices. For most purposes a ratio of one part by volume of juice and one part by apparent volume of cell mixture is satisfactory. Under such circumstances the juice will constitute 50% of the mixture, the intact cells from 10% to 25%, and the ruptured cells from 40% to 25%. However, these proportions are subject to variation and one can readily determine by simple test how much juice and how much cell mixture to combine to give a final product in which there is substantially no segregation of cell-free juice either above or below the apparent volume of the cell mixture. "Apparent" volume is, of course, a well-understood term. It means the volume a mass of irregularly shaped solids appears to occupy.

Alternatively, the juice can be sweetened by the addition of sugar thereto before admixture with the cells. Mixtures of orange juice and grapefruit juice can be combined with mixtures of grapefruit cells and orange cells in proportions desired to meet the fancy of the consumer. In any event, I admix juice and cells and then pass this mixture through any suitable pasteurizing device which is no part of the present invention. This pasteurizing device is the same as that customarily used for the pasteurization of citrus fruit juices and the pasteurizing conditions are substantially identical with those hitherto used for the pasteurization of ordinary citrus juice. Pasteurization is no part of the present invention apart from its use in the process as a normal requirement in the finishing of citrus fruit products. However, the heat of pasteurization may advantageously affect the stability of the mixture if it promotes rapid equalization of the osmotic pressure relationships between whole cells and the outer juice phase, as I have described above.

Thereafter the mixture is conveyed to a can-filling machine and the cans closed in exactly the same manner as ordinary grapefruit and orange juice is handled. Or, if desired, the mixture can be packaged and frozen for sale as a frozen food article.

One of the marked advantages of my process is in the fact that much of the juice handling is similar to that used in the processing of ordinary orange or grapefruit juice. Canning, pasteurizing, etc., are the same.

In my co-pending application Serial No. 697,968, filed September 19, 1946, of even date herewith, I have described and claimed my process of preparing the citrus fruit products of the present invention.

In Figure 2 I show the average form of a whole cell and the average form of a limpid ruptured whole cell. Figure 3 shows in cross-section a container in which the apparent volume of the mixture of juice and cells is occupied by the cells with the juice filling the interstices between the cells.

My process can be used for the processing of any citrus fruit, and I do not wish to be limited to grapefruit. Oranges, lemons and limes can be treated in precisely the same way.

Nor do I wish to be limited to the particular process steps herein described. The steam and hot water jet preliminary treatment can be omitted although I find there is some advantage in first cleaning the fruit and softening it in this way. Other devices for de-celling the meat segments (as contrasted with the drastic burring operations, of the past) can be devised.

Having thus described my invention, what I claim is:

1. A citrus fruit product comprising disintegrated meat of citrus fruit segments in thick suspension in citrus juice, said disintegrated meat predominantly consisting of individual meat cells and including both intact meat cells and ruptured meat cells.

2. A citrus fruit product comprising disintegrated meat of citrus fruit segments in thick suspension in citrus juice, said disintegrated meat predominantly consisting of individual meat cells and including both intact meat cells and ruptured meat cells, the intact meat cells constituting not less than 20% of the total cell mass.

3. A citrus fruit product comprising disintegrated meat of citrus fruit segments in thick suspension in citrus juice, said disintegrated meat predominantly consisting of individual meat cells and including both intact meat cells and ruptured meat cells, the intact meat cells constituting from 20% to 50% of the total cell mass.

4. A citrus fruit product comprising a mixture of substantially equal parts by volume of disintegrated meat of citrus fruit segments suspended in citrus fruit juice, said disintegrated meat predominantly consisting of individual meat cells and including both intact meat cells and ruptured meat cells, the intact meat cells constituting from 10% to 25% and the ruptured meat cells from 40% to 25%, by volume, of the total mixture.

5. A citrus fruit product as set forth in claim 4 in which the disintegrated meat is grapefruit meat.

6. A citrus fruit product as set forth in claim 4 in which the disintegrated meat of citrus fruit segments is suspended in sweetened citrus fruit juice.

JOHN A. BRUCE.

REFERENCES CITED

The following references are of record in the file of this patent:

UNITED STATES PATENTS

| Number | Name | Date |
| --- | --- | --- |
| 1,236,382 | Von Epler | Aug. 7, 1917 |
| 1,601,027 | Lefeore | Sept. 28, 1926 |
| 2,318,178 | McKinnis | May 4, 1943 |
| 2,357,895 | Higby | Sept. 12, 1944 |

OTHER REFERENCES

Publication by the U. S. Dept. of Agriculture, Dept. Circular 232, article entitled "By-Products from Citrus Fruits," by E. M. Chase, pages 1 to 4.